United States Patent Office 2,760,893
Patented Aug. 28, 1956

2,760,893

METHOD OF MAKING TRANSPARENT LAMINATES

Francis F. Koblitz and Jack G. Hilden, Madison, Wis., assignors to Bjorksten Research Laboratories, Inc., a corporation of Illinois No Drawing. Application August 13, 1952, Serial No. 304,228

1 Claim. (Cl. 154—2.73)

This invention relates to transparent laminates comprising a plastic interlayer and more particularly such laminates comprising sheets of glass and having an interlayer thereinbetween comprising silicon resin.

Heretofore transparent laminates of the type provided for safety glass and air craft glazing applications and for like purposes have lacked resistance to high temperature measured as tensile strength at elevated temperatures, have lacked flexibility at ordinary temperatures and at low temperatures such as —40° C., and have lacked transparency and adhesiveness. These properties are most desirable in laminates exposed to temperatures on the order of 500° F. such as are encountered on the outer surfaces of supersonic air craft.

Silicone resins are not believed to have been used heretofore to produce glass laminates which are resistant to high temperatures and are at the same time transparent. We have been able to produce laminates having interlayers comprising polysiloxane resins which are transparent and resistant to high temperatures and so well laminated, the adhesivity of the interlayers for the outer layers being so great, that a high velocity 22 caliber steel projectile fired from a distance of 4 inches produces merely a hole about the size of the projectile and does not produce any delamination.

An object of the invention therefore is to produce transparent laminates having an interlayer comprising polysiloxane resin.

Another object is such laminates having great resistance to high temperature; substantially equal flexibility at elevated temperatures, ordinary room temperatures and low temperatures, such as —40° C.; and in which the adhesivity of the interlayer for the outer layers is such that the laminate is not delaminated by a bullet.

Further objects will become apparent as the following detailed description proceeds, in which it is my intention to illustrate the applicability of the invention without intending to limit its scope.

In accordance with my invention an alkyl or aryl siloxane such as methyl siloxane is polymerized and the polymer is cured with a curing agent, or heat, or both, and is then laminated between glass plates at a high temperature and pressure, cooled while the pressure is maintained, and is then reheated and recooled again while being maintained under a high pressure.

The following examples further illustrate the applicability of my invention:

Example 1

Octamethyl tetrasiloxane is condensed to a siloxane gum by heating at 150° C. with 1% by weight of sulfuric acid (sp. gr. 1.86) for 25 hours. The resultant gum is washed free of sulfuric acid by washing with water on a rubber mill having cadmium-plated rolls. Five per cent by weight of benzoyl peroxide and 0.01% by weight of lead naphthenate are then mixed intimately with the gum on a rubber mill. The gum is milled cold under a state of softness adapted to permit easy molding. The gum is then pressed to a thickness of 0.020" and cured forty-five minutes between glass plates at a temperature of 105° C. in a heated hydraulic press. The resulting laminate is cooled to room temperature while being maintained under pressure. The laminate is then reheated to 75° C. under 10,000 p. s. i. pressure and recooled to room temperature, still under pressure. A strong, impact resistant transparent laminate results.

Example 2

85 parts by weight of dimethyl siloxane gum as produced in Example 1 is mixed intimately on a rubber mill with 15 parts of a poly siloxane having a cross-linking agent incorporated therein and having a ratio of methyl to silicon atoms of 1.896, such as may be obtained commercially under the trade name "Silastic 240," 2.5 parts of benzoyl peroxide, and 0.01 part of lead naphthenate. The resulting dough is pressed between glass plates at 105° C. for 30 minutes at a thickness of 0.030 in. The resulting laminate is cooled to room temperature under 10,000 p. s. i. pressure. The laminate is then reheated to 90° C. and then cooled again, while being still maintained under a pressure of 10,000 pounds per square inch. A transparent laminate results which shows no delamination when struck by a high velocity 22 caliber steel projectile.

Example 3

A high molecular weight siloxane gum containing one methyl radical and one phenyl radical on each silicon atom is condensed and washed as in Example 1. It is milled on a rubber mill with 2.5% benzoyl peroxide by weight and is then pressed between glass plates at 125° C. for one hour at a thickness of 0.040". It is cooled under a pressure of 7,000 p. s. i., reheated at 75° C. for ten minutes and allowed to cool to room temperature while still being maintained under a pressure of 7,000 p. s. i. A strong transparent laminate results.

The examples have shown certain resins, certain curing agents and certain proportions, temperatures and pressures. For the most part these are not critical. The invention is applicable with any polymerized dialkyl siloxane or diaryl siloxane. Other condensing agents, polymerizing agents and fillers are known to the are as equivalent to the sulfuric acid, benzoyl peroxide and lead naphthenate shown in the examples and may equally suitably be used.

However, in order to produce the laminate of my invention, certain steps are critical and are not satisfactorily omitted. The first such critical step consists of heating a layer of polymerized siloxane gum which may have a thickness of as great as ⅛" between glass plates at a temperature of about 90° C. to 150° C. under a pressure of as low as 100 or 200 p. s. i. for a period of 5 minutes to 8 hours, said pressure being determined as that amount of pressure which is necessary to compress the bulk polymerized gum into a sheet of a desired thickness and maintain it in such thickness during the heating cycle. The next critical step is cooling the laminate to room temperature, or to below 30° C., while maintianing a pressure of at least 100 p. s. i. and preferably of 4,000 to 25,000 p. s. i. upon the laminate. The third step consists of again placing the laminate under a pressure substantially equivalent to 10,000 p. s. i. as set forth in the examples (such pressure may be from about 4,000 p. s. i. to 25,000 p. s. i.), reheating the laminate to a temperature of from 65° C. to 95° C. for a few minutes, preferably from 1 to 15 minutes, and of then allowing the laminate to cool to room temperature while still being maintained under said pressure.

Although it is quite apparent that this process produces laminates having physical properties which clearly distinguish them from laminates of the prior art, it has not been possible to determine the exact physical or chemical action by which this unusual and surprising result takes place.

It may thus be seen that the invention is broad in scope and is not to be limited excepting by the claim.

Having thus disclosed my invention, I claim:

The method for making a laminate comprising sheets of glass having a transparent interlayer consisting primarily of diethyl polysiloxane resin laminated thereinbetween comprising the steps of: compressing said resin to a thickness less than ⅛ inch between glass plates, heating said polymer between said glass plates at 105° to 125° C. for 30 minutes to one hour, cooling the resultant sandwich to below 30° C., placing said sandwich under a pressure of 7,000 to 10,000 pounds per square inch and while said pressure is maintained, heating said sandwich to from 65° C. to 95° C., maintaining said temperature for from 1 to 10 minutes, and cooling the resultant laminate to a temperature below 30° C.

References Cited in the file of this patent

UNITED STATES PATENTS

| | | |
|---|---|---|
| 2,379,247 | Muskat | June 26, 1945 |
| 2,379,248 | Muskat | June 26, 1945 |
| 2,467,853 | Poskitt | Apr. 19, 1949 |
| 2,502,286 | Sowa | Mar. 28, 1950 |
| 2,541,137 | Warrick | Feb. 13, 1951 |

OTHER REFERENCES

Larsen et al.: Silicone Resin Bonded Laminates, Modern Plastics, vol. 23, No. 7, March 1946, pp. 160–162.